United States Patent
Lee et al.

(10) Patent No.: US 8,697,282 B2
(45) Date of Patent: Apr. 15, 2014

(54) NEGATIVE ACTIVE FOR RECHARGEABLE LITHIUM BATTERY, METHOD OF PREPARING THE SAME, AND RECHARGEABLE LITHIUM BATTERY INCLUDING THE SAME

(75) Inventors: Chun-Gyoo Lee, Yongin-si (KR); Jae-Myung Kim, Yongin-si (KR); Chang-Wook Kim, Yongin-si (KR); Byung-Joo Chung, Yongin-si (KR); Han-Eol Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 180 days.

(21) Appl. No.: 13/200,347

(22) Filed: Sep. 23, 2011

(65) Prior Publication Data
US 2012/0270103 A1 Oct. 25, 2012

(30) Foreign Application Priority Data
Apr. 21, 2011 (KR) .................... 10-2011-0037381

(51) Int. Cl.
*H01M 4/62* (2006.01)
(52) U.S. Cl.
USPC .................... 429/212; 429/217; 252/182.1
(58) Field of Classification Search
USPC .............................. 429/212, 217; 252/182.1
See application file for complete search history.

(56) References Cited

U.S. PATENT DOCUMENTS

| 7,147,964 | B2 * | 12/2006 | Suzuki et al. ............. 429/217 X |
| 8,343,657 | B2 * | 1/2013 | Minami et al. ............. 429/217 X |
| 2006/0035149 | A1 * | 2/2006 | Nanba et al. ............ 252/182.1 X |
| 2009/0087748 | A1 | 4/2009 | Choi et al. | |

FOREIGN PATENT DOCUMENTS

| JP | 2006-339092 A | 12/2006 |
| JP | 2007-179864 | 7/2007 |
| JP | 2009-152037 | 7/2009 |
| JP | 2010-062041 A | 3/2010 |
| JP | 2010-165471 | 7/2010 |
| KR | 10-20070059717 A | 6/2007 |
| KR | 2009-0009053 A | 1/2009 |
| KR | 10-2009-0067769 A | 6/2009 |
| KR | 10-0918050 | 9/2009 |
| KR | 2010-0073506 A | 7/2010 |

* cited by examiner

*Primary Examiner* — Stephen J. Kalafut
(74) *Attorney, Agent, or Firm* — Lee & Morse, P.C.

(57) ABSTRACT

A negative electrode for a lithium rechargeable battery includes a current collector, and a negative active material layer on the current collector, the negative active material layer including a silicon-based active material, a carbon-based active material, and an aqueous additive including an aqueous binder and an agent for increasing viscosity, the silicon-based active material being coated with an organic binder, wherein the aqueous additive is between portions of the silicon-based active material, between portions of the carbon-based active material, or between the silicon-based active material and the carbon-based active material.

19 Claims, 2 Drawing Sheets

NEGATIVE ACTIVE FOR RECHARGEABLE LITHIUM BATTERY, METHOD OF PREPARING THE SAME, AND RECHARGEABLE LITHIUM BATTERY INCLUDING THE SAME

BACKGROUND

1. Field

This disclosure relates to a negative electrode for a lithium rechargeable battery, a method of preparing the same, and a lithium rechargeable battery including the same.

2. Description of the Related Art

Lithium rechargeable batteries have recently drawn attention as a power source of small portable electronic devices. Lithium rechargeable batteries use an organic electrolyte solution and thereby have twice or more the discharge voltage than that of a battery using an alkali aqueous solution, and accordingly have high energy density.

The rechargeable lithium battery is manufactured by injecting electrolyte into a battery cell, which includes a positive electrode including a positive active material capable of intercalating/deintercalating lithium ions and a negative electrode including a negative active material capable of intercalating/deintercalating lithium ions.

SUMMARY

According to an embodiment, there is provided a negative electrode for a lithium rechargeable battery, the negative electrode including a current collector, and a negative active material layer on the current collector, the negative active material layer including a silicon-based active material, a carbon-based active material, and an aqueous additive including an aqueous binder and an agent for increasing viscosity, the silicon-based active material being coated with an organic binder, wherein the aqueous binder is between portions of the silicon-based active material, between portions of the carbon-based active material, or between the silicon-based active material and the carbon-based active material.

The organic binder may include polyimide, polyamide, polyamideimide, aramid, polyarylate, polymethylethylketone, polyetherimide, polyethersulfone, polysulfone, polyphenylene sulfide, polytetrafluoroethylene, or a combination thereof.

The organic binder may be present in an amount of about 0.3 to about 2 wt % based on a total amount of the negative active material layer.

The silicon-based active material may include Si, a Si-based alloy, $SiO_x$ (0<x<2), a Si-carbon composite, or a combination thereof.

The silicon-based active material may be present in an amount of about 3 to about 50 wt % based on a total amount of the negative active material layer.

The carbon-based active material may be present in an amount of about 50 to about 91 wt % based on a total amount of the negative active material layer.

The aqueous binder may include a styrene-butadiene rubber (SBR), an acrylated styrene-butadiene rubber, polyvinyl alcohol, sodium polyacrylate, a copolymer of (meth)acrylic acid and (meth)acrylic acid alkyl ester, or a combination thereof.

The agent for increasing viscosity may include carboxylmethyl cellulose, hydroxypropylmethyl cellulose, methyl cellulose, alkali metal salts thereof, or a combination thereof.

The aqueous additive may be present in an amount of about 3 to about 20 wt % based on the total amount of the negative active material layer.

According to an embodiment, there is provided a method of preparing a negative electrode for a lithium rechargeable battery, the method including preparing a silicon-based active material coated with an organic binder by mixing a solution including the organic binder in a solvent with the silicon-based active material and removing the solvent, preparing a negative active material layer composition by mixing a carbon-based active material, and an aqueous additive including an aqueous binder and an agent for increasing viscosity, and the silicon-based active material coated with the organic binder, and applying the negative active material layer composition onto the current collector.

The organic binder may include polyimide, polyamide, polyamideimide, aramid, polyarylate, polymethylethylketone, polyetherimide, polyethersulfone, polysulfone, polyphenylene sulfide, polytetrafluoroethylene, or a combination thereof.

The organic binder may be mixed in an amount of about 0.3 to about 2 wt % based on the total amount of the negative active material layer.

The silicon-based active material includes Si, a Si-based alloy, $SiO_x$ (0<x<2), a Si-carbon composite, or a combination thereof.

The silicon-based active material may be mixed in an amount of about 3 to about 50 wt % based on a total amount of the negative active material layer.

The carbon-based active material may be mixed in an amount of about 50 to about 91 wt % based on a total amount of the negative active material layer.

The aqueous binder may include a styrene-butadiene rubber (SBR), an acrylated styrene-butadiene rubber, polyvinyl alcohol, sodium polyacrylate, a copolymer of (meth)acrylic acid and (meth)acrylic acid alkyl ester, or a combination thereof.

The agent for increasing viscosity may include carboxylmethyl cellulose, hydroxypropylmethyl cellulose, methyl cellulose, alkali metal salts thereof, or a combination thereof.

The aqueous additive may be mixed in an amount of about 3 to about 20 wt % based on the total amount of the negative active material layer. The mixing ratio of the aqueous binder and the agent for increasing viscosity may be controlled.

According to an embodiment, there is provided a lithium rechargeable battery, including the negative electrode, a positive electrode; and an electrolyte.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
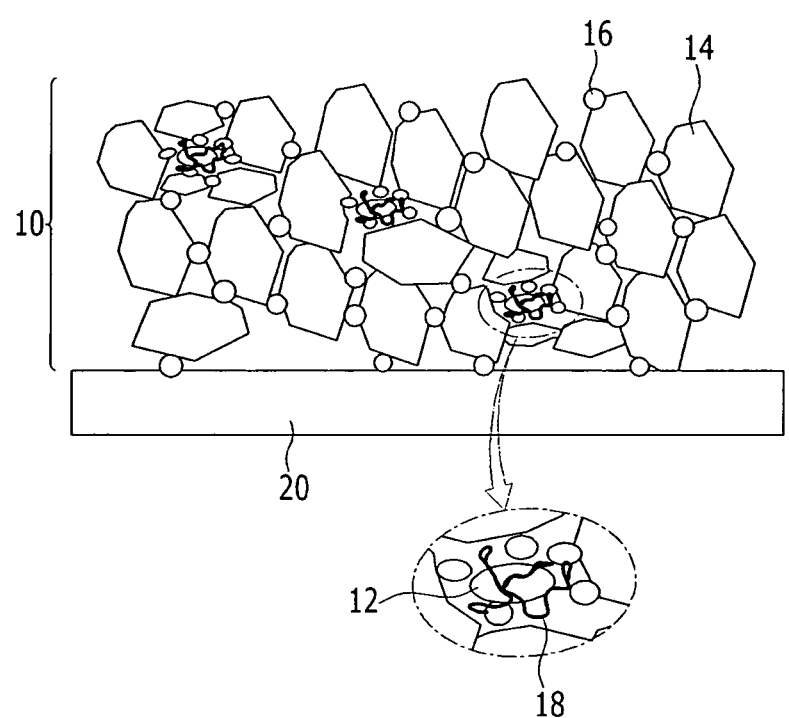
FIG. 1 illustrates a schematic view showing the structure of the negative electrode according to an embodiment.

Korean Patent Application No. 10-2011-0037381, filed on Apr. 21, 2011, in the Korean Intellectual Property Office, and entitled: "Negative Active for Rechargeable Lithium Battery, Method of Preparing the Same, and Rechargeable Lithium Battery Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The negative electrode according to an embodiment includes a current collector and a negative active material layer disposed on the current collector.

The components and an internal structure of the negative active material layer may be described with reference to FIG. 1.

FIG. 1 illustrates a schematic view showing the structure of the negative electrode according to an embodiment.

Referring to FIG. 1, the negative active material layer 10 includes the silicon-based active material 12, the carbon-based active material 14, and the aqueous additive 16 including an aqueous binder and an agent for increasing viscosity. The silicon-based active material 12 is coated with the organic binder 18. The negative active material layer 10 is disposed on a current collector 20.

The aqueous additive 16 may be disposed between silicon-based active materials 12, between carbon-based active materials 14, or between the silicon-based active material 12 and the carbon-based active material 14. For example, the aqueous additive 16 may be disposed between portions of the silicon-based active material 12, such as particles of the silicon active material 12, between portions of the carbon-based active material 14, such as particles of the carbon-based active material 14, or between particles of the silicon-based active material 12 and the carbon-based active material 14.

The carbon-based active material may have an excellent cycle life characteristic. The carbon-based active material may have a coulombic efficiency as high as about 94%. However, the capacity of a carbon-based material may be somewhat low. The silicon-based active material may be a high-capacity material. However, the coulombic efficiency of a silicon-based material may be low and the cycle life characteristic may not be good. When lithium ions react with a silicon-based active material during a charge, the volume of the active material may expand, and as the lithium ions migrate from the active material during a discharge, the volume of the active material may decrease. The volumetric change may be so great after repeated cycles of charge and discharge that the electric conductivity between the active materials or between a current collector and the active material may decrease. Thus, the cycle life characteristic may be poor.

According to an embodiment, not only high capacity but also excellent electric conductivity and cycle life characteristic may be simultaneously acquired by using a silicon-based active material and a carbon-based active material together, for example, as a hybrid active material.

Also, according to another embodiment, a binder system appropriate for the hybrid active material may be used.

An aqueous binder has economical and environmental advantages, when compared with the organic binder requiring an organic solvent that may be harmful to human beings and the environment, and requiring a recovering process during the electrode preparation. However, when the aqueous binder is applied to the hybrid active material that includes both carbon-based active material and silicon-based active material together, the aqueous binder may not perform a buffering function for the silicon-based active material, which has great volumetric change during a charge/discharge, which may be problematic. If organic binder having elasticity of an appropriate level and capable of performing a buffering function were to be applied to a mixture of a carbon-based active material and the silicon-based active material using an organic solvent, the preparing process may become complex, and the preparation cost may increase. Also, since the amount of the organic binder may have to be increased, the active material ratio may be decreased, which may lead to a decreased capacity.

According to an embodiment, a silicon-based active material coated with an organic binder is used, and the aqueous binder exists between the silicon-based active materials coated with the organic binder, between carbon-based active materials, or between the silicon-based active material coated with the organic binder and the carbon-based active material to connect them.

The silicon-based active material may be directly coated with a highly elastic organic binder. The volumetric change of the silicon-based active material may be effectively suppressed so as to improve the cycle life characteristic. Also, an organic solvent does not have to be used in a substantial electrode fabrication process. The fabrication process may become simple and the production cost is not increased. Moreover, the amount of the organic binder does not have to be increased. More of the silicon-based active material may be used so as to secure high-capacity and excellent cycle life characteristics. Also, a great amount of an aqueous binder of the total amount of the binder is present. The adherence between the silicon-based active material and the carbon-based active material may be excellent, which makes it possible to provide a lithium rechargeable battery having high capacity and excellent cycle life characteristic.

The organic binder may coat the entire surface or part of the surface of the silicon-based active material surface.

The silicon-based active material may be coated with the organic binder by mixing a solution prepared by dissolving the organic binder in a solvent with the silicon-based active material, and drying and removing the solvent. Herein, the coating thickness may be determined based on the concentration of the organic binder in the solution, the temperature of the solution, and the time that the silicon-based active material spends in the solution.

As the solvent, N-methylpyrrolidone and the like may be used.

The organic binder may include polyimide, polyamide, polyamideimide, aramid, polyarylate, polymethylethylketone, polyetherimide, polyethersulfone, polysulfone, polyphenylene sulfide, polytetrafluoroethylene, or a combination thereof. For example, a polyimide having high elasticity may be used.

The organic binder may be included in an amount of about 0.3 to about 2 wt % based on the total amount of the negative active material layer. According to an embodiment, the organic binder may be included in an amount of about 0.5 to about 1.2 wt %. When the amount of the organic binder falls in this range, amounts of the silicon-based active material and the carbon-based active material may be maintained at appropriate levels so as to secure high-capacity and excellent cycle life characteristics.

The silicon-based active material may include Si, a Si-based alloy, $SiO_x$ (0<x<2), a Si-carbon composite, or a combination thereof. Here, the term "Si" without further qualification may refer to silicon by itself, such as in the form of silicon particles. The Si-based alloy may an alloy of an alkali metal, an alkaline-earth metal, a Group 13 element, a Group 14 element, a transition element, a rare earth element, or a combination thereof, with Si. Also, the Si-carbon composite may be of a form where a carbon-based material, e.g., graphite, is coated with Si nanoparticles or a form where Si nanoparticles are impregnated in the pores of the graphite.

The silicon-based active material may be included in an amount of about 3 to about 50 wt %, particularly about 10 to about 30 wt % based on the total amount of the negative active material layer. When the amount of the silicon-based active material falls in this range, the lithium rechargeable battery may be secured with high capacity.

Examples of the carbon-based active material include crystalline carbon, amorphous carbon, and a mixture thereof. The crystalline carbon may include at least one of shapeless graphite, sheet-type graphite, flake-type graphite, spherical-shaped graphite or fiber-shaped natural graphite, artificial graphite and a mixture thereof. The amorphous carbon may include at least one of soft carbon or hard carbon, mesophase pitch carbonized product, fired cokes, or a mixture thereof.

The carbon-based active material may be included in an amount of about 50 to about 91 wt % based on the total amount of the negative active material layer. According to an embodiment, the carbon-based material may be included in an amount of about 70 to about 90 wt %. When the amount of the carbon-based active material falls in this range, the lithium rechargeable battery may be secured with excellent cycle life characteristic.

The aqueous binder may include a styrene-butadiene rubber (SBR), an acrylated styrene-butadiene rubber, polyvinyl alcohol, sodium polyacrylate, a copolymer of (meth)acrylic acid and (meth)acrylic acid alkyl ester, or a combination thereof. The agent for increasing viscosity may include a cellulose-based compound. The cellulose-based compound may include one or more of carboxylmethyl cellulose, hydroxypropylmethyl cellulose, methyl cellulose, alkali metal salts thereof. The alkali metal may be sodium (Na), potassium (K), or lithium (Li).

The aqueous additive may be included in an amount of about 3 to about 20 wt % or about 5 to about 12 wt % based on the total amount of the negative active material layer. The mixing ratio of the aqueous binder and the agent for increasing viscosity may be suitable controlled. When the amount of the aqueous additive falls in this range, an organic solvent may be omitted. Therefore, the preparation process may become simple and the preparation cost may be reduced. It may be possible to provide a lithium rechargeable battery with high capacity and excellent cycle life characteristic.

The negative active material layer may further include a conductive material. The conductive material may be included to improve electrode conductivity. Any electrically conductive material that does not cause a chemical change may be used as a conductive material. Examples of the conductive material include metal-based materials including a metal powder or a metal fiber of copper, nickel, aluminum, silver, and the like; or conductive polymers such as polyphenylene derivatives; or a mixture thereof.

The negative active material layer may be formed in the following method.

A silicon-based active material coated with an organic binder may be prepared by mixing a solution prepared by dissolving the organic binder in a solvent with a silicon-based active material, and removing the solvent. Subsequently, a negative active material layer composition may be prepared by mixing the silicon-based active material coated with the organic binder, a carbon-based active material, and an aqueous additive including an aqueous binder and an agent for increasing viscosity. The composition may further include a solvent such as water.

A negative electrode may be fabricated by coating a current collector with the above-prepared negative active material layer composition.

The current collector may be a copper foil, a nickel foil, a stainless steel foil, a titanium foil, a nickel foam, a copper foam, a polymer substrate coated with a conductive metal, or combinations thereof.

Figure 2:
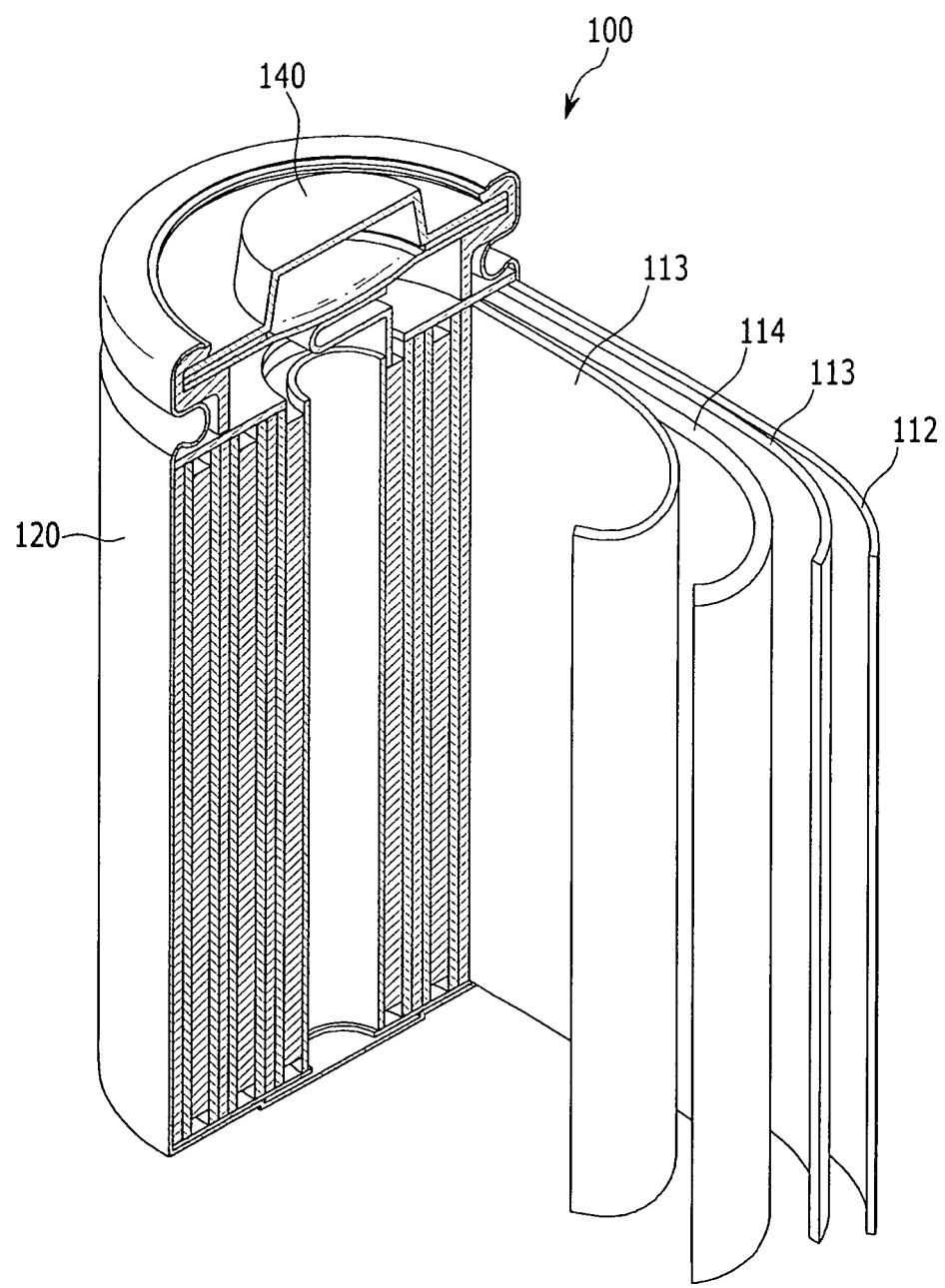
FIG. 2 illustrates a schematic view showing the lithium rechargeable battery according to an embodiment.

The rechargeable lithium battery including the positive electrode according to another embodiment is described referring to FIG. 2.

FIG. 2 illustrates a schematic view of a rechargeable lithium battery according to an embodiment.

FIG. 2 illustrates a rechargeable lithium battery 100, which includes a positive electrode 114, a negative electrode 112 facing the positive electrode 114, a separator 113 interposed between the negative electrode 112 and the positive electrode 114, an electrolyte (not shown) impregnating the separator 113, a battery case 120, and a sealing member 140 sealing the battery case 120.

The negative electrode 112 is the same as described above.

The positive electrode 114 may include a current collector and a positive active material layer disposed on the current collector. The positive active material layer may include a positive active material, a binder. The positive active material layer may also include a conductive material.

The current collector may be aluminum (Al).

The positive active material may include lithiated intercalation compounds that reversibly intercalate and deintercalate lithium ions. The positive active material may include a composite oxide including at least one of cobalt, manganese, and nickel, as well as lithium. In particular, the following lithium-containing compounds may be used:

$Li_aA_{1-b}B_bD_2$ (0.90≤a≤1.8 and 0≤b≤0.5); $Li_aE_{1-b}B_bO_{2-c}D_c$ (0.90≤a≤1.8, 0≤b≤0.5, 0≤c≤0.05); $Li_aE_{2-b}B_bO_{4-c}D_c$ (0.90≤a≤1.8, 0≤b≤0.5, 0≤c≤0.05); $Li_aNi_{1-b-c}Co_bB_cD_\alpha$ (0.90≤a≤1.8, 0≤b≤0.5, 0≤c≤0.05, 0<α≤2); $Li_aNi_{1-b-c}Co_bB_cO_{2-\alpha}F_\alpha$ (0.90≤a≤1.8, 0≤b≤0.5, 0≤c≤0.05, 0<α<2); $Li_aNi_{1-b-c}Co_bB_cO_{2-\alpha}F_2$ (0.90≤a≤1.8, 0≤b≤0.5, 0≤c≤0.05, 0<α<2); $Li_aNi_{1-b-c}Mn_bB_cD_\alpha$ (0.90≤a≤1.8, 0≤b≤0.5, 0≤c≤0.05, 0<α≤2); $Li_aNi_{1-b-c}Mn_bB_cO_{2-\alpha}F_\alpha$ (0.90≤a≤1.8, 0≤b≤0.5, 0≤c≤0.05, 0<α<2); $Li_aNi_{1-b-c}Mn_bB_cO_{2-\alpha}F_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dGeO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compound may have a coating layer on the surface, or may be mixed with a compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compounds for a coating layer may be amorphous or crystalline. The coating element for a coating layer may include Mg, Al, Co, K, Na, Ca, Si, Ti, V, Sn, Ge, Ga, B, As, Zr, or a mixture thereof. The coating layer may be formed by a method that avoids a negative influence on properties of a positive active material by including these elements in the compound. For example, the method may include any coating method such as spray coating, dipping, and the like.

The binder may improve binding properties of the positive active material particles to each other and to a current collector. Examples of the binder include at least one of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material may be used in order to improve conductivity of an electrode. Any electrically conductive material that does not cause a chemical change may be used as a conductive material. Examples of the conductive material include natural graphite, artificial graphite, carbon black, acetylene black, ketjen black, a carbon fiber, a metal powder or a metal fiber including copper, nickel, aluminum, silver, and so on, and a polyphenylene derivative.

The positive electrode 114 may be manufactured by a method including mixing the active material, a conductive material, and a binder to provide an active material composition, and coating the composition on a current collector.

A solvent such as N-methylpyrrolidone may be used.

The electrolyte solution may include a non-aqueous organic solvent and a lithium salt.

The non-aqueous organic solvent may serve as a medium for transmitting ions taking part in the electrochemical reaction of the battery. The non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like.

When a linear carbonate compound and a cyclic carbonate compound are mixed with each other, the dielectric constant may increase and the viscosity may decrease. The cyclic carbonate compound and linear carbonate compound may be mixed together in the volume ratio of about 1:1 to about 1:9.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutylether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like.

The non-aqueous organic solvent may be used singularly or in a mixture. When the organic solvent is used in a mixture, the mixture ratio can be controlled in accordance with a desirable battery performance.

The non-aqueous electrolyte may further include an overcharge-inhibiting compound such as ethylene carbonate, pyrocarbonate, and the like.

The lithium salt may supply lithium ions in the battery, perform a basic operation of a rechargeable lithium battery, and improve lithium ion transport between positive and negative electrodes.

Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bisoxalate borate, LiBOB), or a combination thereof.

The lithium salt may be used at a concentration ranging from about 0.1 to about 2.0M. When the lithium salt is included at this concentration range, electrolyte performance and lithium ion mobility may be enhanced due to optimal electrolyte conductivity and viscosity.

The separator 113 may be formed as a single layer or a multilayer, and may be made of polyethylene, polypropylene, polyvinylidene fluoride, or a combination thereof.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Fabrication of Lithium Rechargeable Battery Cell

Example 1

The surface of SiO was coated with polyimide by putting SiO powder into a solution containing polyimide dissolved in N-methylpyrrolidone, agitating the mixed solution, and removing the N-methylpyrrolidone to dry the mixed solution.

Subsequently, a negative active material layer composition was prepared by mixing 10 wt % of the SiO coated with the polyimide, 80 wt % of graphite, and 10 wt % of a styrene-butadiene rubber and carboxylmethyl cellulose in water. The mixing ratio of the styrene-butadiene rubber and carboxylmethyl cellulose was a 50:50 weight ratio. The amount of the polyimide was 0.56 wt % based on the total amount of the negative active material layer composition.

A negative electrode was formed by coating a 15 μm-thick copper foil with the negative active material layer composition, and drying and compressing the coated foil.

A coin-type half-cell was fabricated by using lithium metal as a counter electrode of the negative electrode. Herein, a solution prepared by dissolving 1.15M $LiPF_6$ in a mixed solution of ethylene carbonate (EC), ethylmethyl carbonate (EMC) and dimethyl carbonate (DMC) prepared at a volume ratio of 3:3:4 was used as an electrolyte solution.

Example 2

A half-cell was fabricated according to the same method as Example 1, except that a negative active material layer composition was prepared by mixing 20 wt % of SiO coated with polyimide, 70 wt % of graphite, and 10 wt % of styrene-butadiene rubber and carboxylmethylcellulose. Herein, the amount of the polyimide was 0.56 wt % based on the total amount of the negative active material layer composition.

Example 3

A half-cell was fabricated according to the same method as Example 1, except that a negative active material layer composition was prepared by mixing 30 wt % of SiO coated with polyimide, 60 wt % of graphite, and 10 wt % of styrene-butadiene rubber and carboxylmethylcellulose. Herein, the amount of the polyimide was 0.84 wt % based on the total amount of the negative active material layer composition.

Example 4

A half-cell was fabricated according to the same method as Example 1, except that a negative active material layer composition was prepared by mixing 40 wt % of SiO coated with polyimide, 50 wt % of graphite, and 10 wt % of styrene-butadiene rubber and carboxylmethylcellulose. Herein, the amount of the polyimide was 1.12 wt % based on the total amount of the negative active material layer composition.

Comparative Example 1

A half-cell was fabricated according to the same method as Example 1, except that a negative active material layer composition was prepared by mixing 10 wt % of SiO, 80 wt % of graphite, and 10 wt % of styrene-butadiene rubber and carboxylmethylcellulose in water.

Comparative Example 2

A half-cell was fabricated according to the same method as Example 1, except that a negative active material layer composition was prepared by mixing 10 wt % of SiO, 80 wt % of graphite, and 10 wt % of polyimide dissolved in N-methylpyrrolidone. Experimental Example: Evaluation of charge and discharge characteristics of lithium rechargeable battery cell The charge and discharge characteristics of the lithium rechargeable battery cells fabricated according to Examples 1 to 4 and Comparative Examples 1 and 2 were measured according to the following method, and the measurement results are presented in the following Table 1.

The discharge capacities were measured by setting a cut-off voltage to 0.01V and charging the battery cells in a CC-CV mode and discharging them in a CC mode at a rate of 0.2 C till 1.5V. Subsequently, 50 cycles were performed by repeating 0.5 C/0.5 C charge/discharge, and then their capacity retentions were measured. The measurement results were shown in the following Table 1.

The capacity retentions are percentage values of a discharge capacity after 50 cycles based on the initial discharge capacity at a rate of 0.5 C.

TABLE 1

|  | Initial discharge capacity (0.2 C rate) (mAh/g) | Capacity retention (0.5 C rate) (%) |
| --- | --- | --- |
| Example 1 | 475 | 80.3 |
| Example 2 | 519 | 77.2 |
| Example 3 | 613 | 73.5 |
| Example 4 | 679 | 71.1 |
| Comparative Example 1 | 440 | 39.6 |
| Comparative Example 2 | 435 | 79.5 |

It may be seen from Table 1 that Examples 1 to 4 using the negative active material layer including the silicon-based active material coated with the organic binder, the carbon-based active material and the aqueous binder had high-capacity and excellent cycle life characteristic, compared with Comparative Examples 1 and 2.

Also, when Examples 1 to 4 are compared with each other, Examples 1 and 2 having a relatively small rate of the silicon-based active material maintained an excellent cycle life and high capacity.

Also, since Comparative Example 1, in which an organic binder was not used, could not prevent a volumetric change of the silicon-based active material during charge and discharge, the cycle life characteristic was remarkably deteriorated. Also, Comparative Example 2, in which an aqueous binder was not used and in which a silicon-based active material was used without an organic binder coating hardly provided a high-capacity lithium rechargeable battery cell.

By way of summation and review, graphite that is used as a negative active material has a specific capacity of about 372 mAh/g, and has a coulombic efficiency of about 94%. Thus the graphite negative active material has an excellent cycle life characteristic. On the other hand, a silicon-based active material has a specific capacity of 1,000 to 2,000 mAh/g, which is a remarkably high-capacity, but since a silicon-based active material has a low coulombic efficiency and may be subject to volume expansion and contraction occur during charge and discharge, a silicon-based active material has inferior cycle-life characteristic.

Accordingly, a carbon-based active material, such as graphite, and a silicon-based active material may be mixed as described herein so as to increase the capacity and acquire excellent cycle life characteristic.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A negative electrode for a lithium rechargeable battery, the negative electrode comprising:
    a current collector; and
    a negative active material layer on the current collector, the negative active material layer including a mixture of a silicon-based active material that is directly coated with an organic binder, a carbon-based active material, and an aqueous additive including an aqueous binder and an agent for increasing viscosity;
    wherein the aqueous additive is between portions of the silicon-based active material, between portions of the carbon-based active material, or between the silicon-based active material and the carbon-based active material.

2. The negative electrode as claimed in claim 1, wherein the organic binder includes polyimide, polyamide, polyamideimide, aramid, polyarylate, polymethylethylketone, polyetherimide, polyethersulfone, polysulfone, polyphenylene sulfide, polytetrafluoroethylene, or a combination thereof.

3. The negative electrode as claimed in claim 1, wherein the organic binder is present in an amount of about 0.3 to about 2 wt % based on a total amount of the negative active material layer.

4. The negative electrode as claimed in claim 1, wherein the silicon-based active material includes Si, a Si-based alloy, $SiO_x$ (0<x<2), a Si-carbon composite, or a combination thereof.

5. The negative electrode as claimed in claim 1, wherein the silicon-based active material is present in an amount of about 3 to about 50 wt % based on a total amount of the negative active material layer.

6. The negative electrode as claimed in claim 1, wherein the carbon-based active material is present in an amount of about 50 to about 91 wt % based on a total amount of the negative active material layer.

7. The negative electrode as claimed in claim 1, wherein the aqueous binder includes a styrene-butadiene rubber, an acrylated styrene-butadiene rubber, polyvinyl alcohol, sodium polyacrylate, a copolymer of (meth)acrylic acid and (meth)acrylic acid alkyl ester, or a combination thereof.

8. The negative electrode as claimed in claim 1, wherein the agent for increasing viscosity includes carboxylmethyl cellulose, hydroxypropylmethyl cellulose, methyl cellulose, alkali metal salts thereof, or a combination thereof.

9. The negative electrode as claimed in claim 1, wherein the aqueous additive is present in an amount of about 3 to about 20 wt % based on the total amount of the negative active material layer.

10. A method of preparing a negative electrode for a lithium rechargeable battery, the method comprising:
    preparing a silicon-based active material coated with an organic binder by mixing a solution including the organic binder in a solvent with the silicon-based active material and removing the solvent;
    preparing a negative active material layer composition by mixing a carbon-based active material, and an aqueous additive including an aqueous binder and an agent for increasing viscosity, and the silicon-based active material coated with the organic binder; and
    applying the negative active material layer composition onto the current collector.

11. The method as claimed in claim 10, wherein the organic binder includes polyimide, polyamide, polyamideimide, aramid, polyarylate, polymethylethylketone, polyetherimide, polyethersulfone, polysulfone, polyphenylene sulfide, polytetrafluoroethylene, or a combination thereof.

12. The method as claimed in claim 10, wherein the organic binder is mixed in an amount of about 0.3 to about 2 wt % based on the total amount of the negative active material layer.

13. The method as claimed in claim 10, wherein the silicon-based active material includes Si, a Si-based alloy, $SiO_x$ (0<x<2), a Si-carbon composite, or a combination thereof.

14. The method as claimed in claim 10, wherein the silicon-based active material is mixed in an amount of about 3 to about 50 wt % based on a total amount of the negative active material layer.

15. The method as claimed in claim 10, wherein the carbon-based active material is mixed in an amount of about 50 to about 91 wt % based on a total amount of the negative active material layer.

16. The method as claimed in claim 10, wherein the aqueous binder includes a styrene-butadiene rubber, an acrylated styrene-butadiene rubber, polyvinyl alcohol, sodium polyacrylate, a copolymer of (meth)acrylic acid and (meth)acrylic acid alkyl ester, or a combination thereof.

17. The method as claimed in claim 10, wherein the agent for increasing viscosity includes carboxylmethyl cellulose, hydroxypropylmethyl cellulose, methyl cellulose, alkali metal salts thereof, or a combination thereof.

18. The method as claimed in claim 10, wherein the aqueous additive is mixed in an amount of about 3 to about 20 wt % based on the total amount of the negative active material layer.

19. A lithium rechargeable battery, comprising
    the negative electrode as claimed in claim 1;
    a positive electrode; and
    an electrolyte.

* * * * *